(12) United States Patent
Ibrahim

(10) Patent No.: US 10,812,275 B2
(45) Date of Patent: Oct. 20, 2020

(54) DECOUPLING AND UPDATING PINNED CERTIFICATES ON A MOBILE DEVICE

(71) Applicant: American Express Travel Related Services Company, Inc., New York, NY (US)

(72) Inventor: Wael Ibrahim, San Diego, CA (US)

(73) Assignee: AMERICAN EXPRESS TRAVEL RELATED SERVICES COMPANY, INC., New York, NY (US)

(*) Notice: Subject to any disclaimer, the term of this patent is extended or adjusted under 35 U.S.C. 154(b) by 35 days.

(21) Appl. No.: 15/824,846

(22) Filed: Nov. 28, 2017

(65) Prior Publication Data
US 2019/0165950 A1 May 30, 2019

(51) Int. Cl.
*H04L 9/32* (2006.01)
*H04W 4/50* (2018.01)
*H04W 4/60* (2018.01)
*G06F 16/23* (2019.01)

(52) U.S. Cl.
CPC ............ *H04L 9/3263* (2013.01); *G06F 16/23* (2019.01); *H04W 4/50* (2018.02); *H04W 4/60* (2018.02)

(58) Field of Classification Search
CPC ........ H04L 9/3263; G06F 16/23; H04W 4/60; H04W 4/50
USPC .......................................................... 713/156
See application file for complete search history.

(56) References Cited

U.S. PATENT DOCUMENTS

| | | | |
|---|---|---|---|
| 9,912,486 B1* | 3/2018 | Sharifi Mehr | H04L 9/3268 |
| 2008/0091952 A1* | 4/2008 | Sumner | H04L 63/064 |
| | | | 713/185 |
| 2012/0005481 A1* | 1/2012 | Kusudo | H04N 7/147 |
| | | | 713/175 |
| 2015/0128205 A1 | 5/2015 | Mahaffey et al. | |
| 2016/0080363 A1* | 3/2016 | Taboso | H04L 63/0823 |
| | | | 713/156 |
| 2017/0054708 A1 | 2/2017 | Zaw et al. | |
| 2017/0230355 A1* | 8/2017 | Su | H04L 63/0823 |
| 2018/0091314 A1* | 3/2018 | Li | H04L 9/0643 |

OTHER PUBLICATIONS

International Search Report and Written Opinion dated Jan. 18, 2019 in PCT Application No. PCT/US2018/059659.

\* cited by examiner

*Primary Examiner* — Teshome Hailu
(74) *Attorney, Agent, or Firm* — Greenberg Traurig, LLP

(57) ABSTRACT

Systems for decoupling and updating pinned certificates on a user device are disclosed. A mobile application having a hardcoded pinned certificate may be installed on a user device. The pinned certificate may be decoupled from the mobile application and stored on the user device. In response to the mobile application attempting to establish a secure connection with a server, the system may check whether the decoupled pinned certificate is current by querying a certificate repository. In response to determining that the pinned certificate is out of date, the system may transmit the current certificate to the user device to update the decoupled pinned certificate.

14 Claims, 5 Drawing Sheets

DECOUPLING AND UPDATING PINNED CERTIFICATES ON A MOBILE DEVICE

FIELD

The disclosure generally relates to secure communications over an unsecured network, and more specifically, to systems and methods for decoupling and updating pinned certificates on a mobile device.

BACKGROUND

Communications over computer networks may be unsecured. For example, communications between a mobile device and a server over a computer network may be susceptible to eavesdroppers intercepting the communication.

However, communications may be secured using Secure Sockets Layer (SSL) or Transport Layer Security (TLS) protocols. SSL and TLS are cryptographic protocols that provide communications security over a computer network by using digital certificates to provide authentication and encryption. To verify that the digital certificate is genuine and valid, the digital certificate can be digitally signed by a hierarchy (e.g., a chain) of digital certificates, such as a root certificate, followed by an intermediate certificate that is signed by the root certificate. The digital certificates may be issued by a trusted certificate authority (CA). The mobile device and the server may maintain lists of trusted CA root certificates to verify that the digital certificates have been issued and signed by trusted CA's. Protocols that rely on digital certificate chain verification (e.g., SSL and TLS) may be vulnerable to a number of attacks, such as man-in-the-middle attacks, wherein an unauthorized party is able to view and modify communications between the mobile device and the server.

Certificate pinning may be used to specify certificates to use for validation, and may at least partially mitigate vulnerability in digital certificate chain verifications. Certificate pinning may refer to the process of hardcoding (e.g. "pinning") a certificate into an application or browser on the mobile device. The hardcoded certificate may correspond to a digital certificate stored in the server such that the digital certificates can be verified and validated to establish secure communications between the mobile device and the server. However, in response to an update to the certificate, the hardcoded certificate in the application or browser must be updated to reflect the new certificate (and to match the certificate stored on the server). Additionally, certificates often comprise expiration dates (e.g., two years, etc.), and the hardcoded certificate in the application or browser must be updated in response to the certificate expiring. As such, an updated application or browser must be developed, coded and published to account for the updated certificate. Moreover, users of the mobile device may be forced to update and/or reinstall the application or browser before communications can again be established with the server.

SUMMARY

Systems, methods, and articles of manufacture (collectively, the "system") for decoupling and updating pinned certificates are disclosed. The system may receive a connection request from a mobile application installed on a user device. The user device may comprise a pinned certificate that is decoupled from the mobile application. The system may determine a certificate version of the pinned certificate. The system may query a certificate repository based on the pinned certificate to locate a stored certificate. The system may determine whether the certificate version of the pinned certificate matches a second certificate version of the stored certificate in the certificate repository. The system may transmit the stored certificate to the user device, in response to the certificate version of the pinned certificate not matching the second certificate version of the stored certificate. The system may update the pinned certificate on the user device to comprise data from the stored certificate.

In various embodiments, the pinned certificate may comprise a leaf certificate digitally signed by an intermediate certificate, wherein the intermediate certificate is digitally signed by a root certificate. In response to the certificate version of the pinned certificate not matching the second certificate version of the stored certificate, the leaf certificate in the pinned certificate may be different than a second leaf certificate in the stored certificate. The system may also validate the pinned certificate by decrypting the root certificate and the intermediate certificate.

In various embodiments, the system may also grant the connection request from the mobile application in response to updating the pinned certificate on the user device.

In various embodiments, the system may also install the mobile application on the user device, wherein the mobile application comprises the pinned certificate. The system may also decouple the pinned certificate from the mobile application, and storing, by the processor, the decoupled pinned certificate on the user device.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

The system may allow for the partial or full decoupling of pinned certificates, wherein the pinned certificates may be partially or fully hardcoded into applications or browsers (e.g., for a mobile device). The system may also enable the updating of decoupled pinned certificates, without needing or forcing a partial or full update to the corresponding application or browser. In that respect, software developers may not need to at least partially manually hardcode new certificates into an updated application, in response to the previously pinned certificate needing an update. Thus, the software development process may be improved and downtime may be reduced during certificate updating. The system may maintain integrity and authenticity for the decoupled pinned certificate by tightly coupling the application and pinned data in the mobile device through the use of a secured storage database on the device (e.g., via White Box Cryptography, etc.). The system may therefore improve the computer functioning and computer security in the mobile device by increasing the security around the pinned certificate and by making it at least partially more difficult for attackers to roll back the pinned certificate or retrieve the pinned certificate. Such a system also allows the transmission of confidential data between the mobile device and the server to be more secure than typical systems in the prior art.

Figure 1:
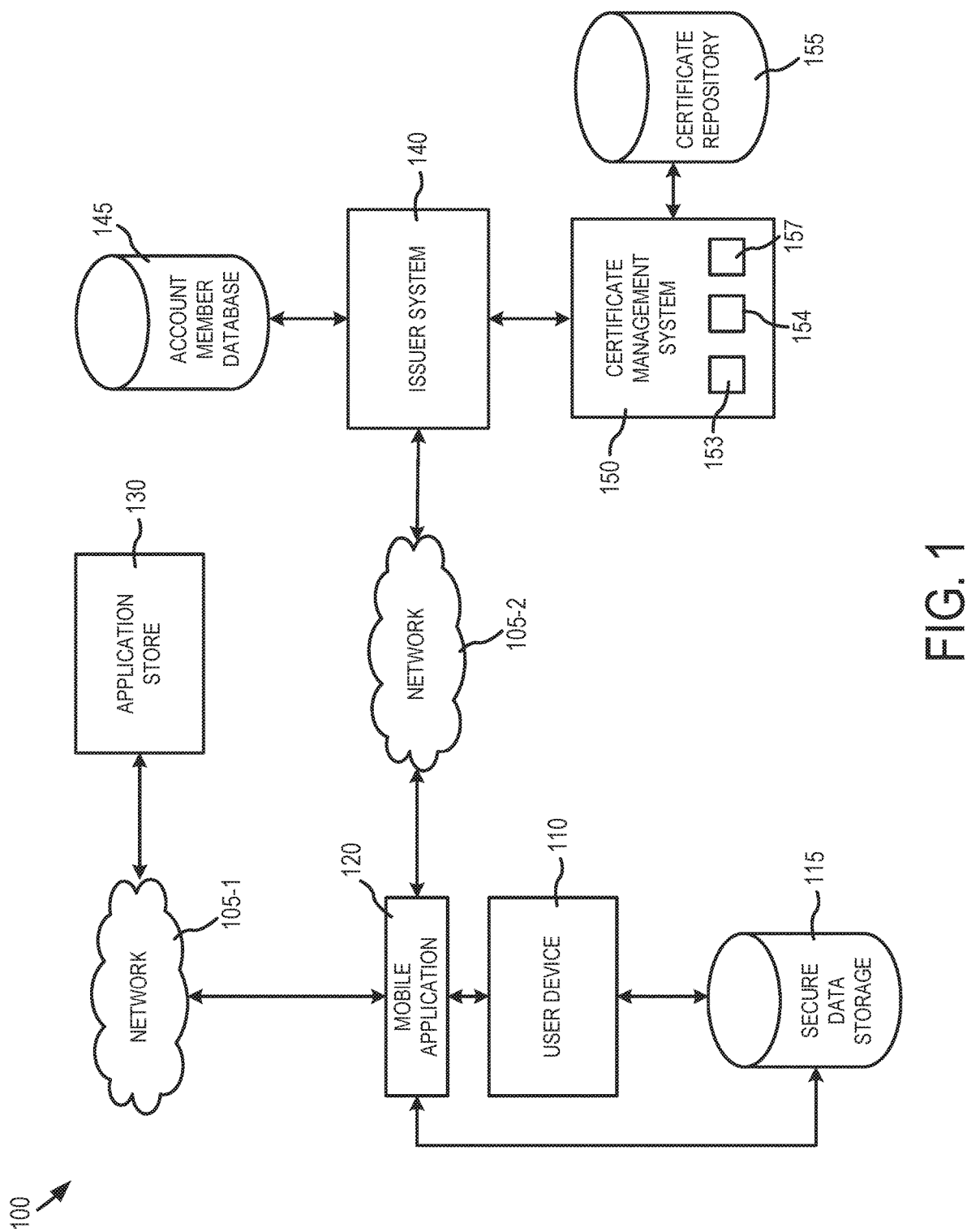
FIG. 1 is a block diagram illustrating various system components of a system for decoupling and updating a pinned certificate on a user device, in accordance with various embodiments.

The system further improves the functioning of the computer (e.g., user device 110, with brief reference to FIG. 1). For example, by automating the decoupling and updating of confidential data (e.g., the pinned certificates) as opposed to needing the user, developer, or the like to manually input data (e.g., the updated pinned certificates) or manually code the updated pinned certificate to an updated application, the user performs less computer functions and provides less input, which saves on data storage and memory, thus speeding processing in the computer. Similarly, by decoupling the pinned certificate from the application and enabling updates to the pinned certificate without needing a reinstallation or update of the corresponding application, battery life on the computer (e.g., smartphone, cell phone, etc.) may be improved. Additionally, by decoupling and updating pinned certificates using the processes described herein, the security of the communications between the computer and the server is improved, which decreases the risk of the computer or network (e.g., network 105-1, 105-2), or the data itself (including confidential data such as transaction account data) from being compromised.

As used herein, "electronic communication" means communication of at least a portion of the electronic signals with physical coupling (e.g., "electrical communication" or "electrically coupled") and/or without physical coupling and via an electromagnetic field (e.g., "inductive communication" or "inductively coupled" or "inductive coupling"). As used herein, "transmit" may include sending at least a portion of the electronic data from one system component to another (e.g., over a network connection). Additionally, as used herein, "data" may include encompassing information such as commands, queries, files, data for storage, and the like in digital or any other form.

As used herein, a "leaf certificate" may refer to a digital certificate issued by the owner of an application, or by the server. The leaf certificate may comprise a public key, a security hash, or other encryption mechanism used to partially or fully encrypt handshake messages sent to a server (e.g., issuer system 140) to establish a secure communication amongst the parties (e.g., via an SSL/TLS connection, or the like). The server (e.g., issuer system 140) comprises the private key that can be used to partially or fully decrypt the handshake messages. The leaf certificate may be signed by an intermediate certificate that is signed by a root certificate. The intermediate certificate and the root certificate may be issued by a trusted certificate authority (CA). The server (e.g., issuer system 140) may comprise a trusted CA certificate storage where it can identify the CA that signed the root certificate and/or the intermediate certificate, find the corresponding CA certificate in the trusted CA certificate storage to retrieve the public key, and/or use the public key to validate that the signature is genuine. The certificate chain (e.g., the leaf certificate signed by the intermediate certificate that is signed by the root certificate) may be embedded (e.g., pinned) within an application during a certificate pinning process, as discussed further herein.

In various embodiments, and with reference to FIG. 1, a system 100 for decoupling and updating a pinned certificate is disclosed. System 100 may contemplate uses in association with web services, utility computing, pervasive and individualized computing, security and identity solutions, autonomic computing, cloud computing, commodity computing, mobility and wireless solutions, open source, biometrics, grid computing and/or mesh computing. System 100 may comprise one or more of a user device 110, a secure data storage 115, a mobile application 120, an application store 130, an issuer system 140, an account member database 145, a certificate management system 150, and/or a certificate repository 155. System 100 may also comprise one or more networks 105-1, 105-2, as described further herein. The various devices, databases, systems, and modules in system 100 may be in direct logical communication with each other via a bus, network, and/or through any other suitable means, or may be individually connected as described further herein.

In various embodiments, network 105-1 and network 105-2 may comprise logically distinct and/or physically distinct networks, or may comprise the same network. Network 105-1 may enable communications from user device 110, via mobile application 120, to application store 130, as discussed further herein. Network 105-2 may enable secured communications between user device 110, via mobile application 120, and issuer system 140, as discussed further herein.

As used herein, the term "network" may include any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., IPHONE®, BLACKBERRY®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, APPLE® talk, IP-6, NetBIOS®, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein.

The various system components may be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing.

In various embodiments, user device 110 may comprise any suitable hardware, software, and/or database components capable of sending, receiving, and storing data. For example, user device 110 may comprise a personal computer, personal digital assistant, cellular phone, smartphone (e.g., IPHONE®, BLACKBERRY®, and/or the like), kiosk, and/or the like. User device 110 may comprise an operating system operating system, such as, for example, a WINDOWS® mobile operating system, an ANDROID® Operating System, APPLE® IOS®, a BLACKBERRY® operating system and the like. User device 110 may be in operative and/or electronic communication with a mobile application 120 and/or a secure data storage 115. In various embodiments, mobile application 120 and/or secure data storage 115 may also comprise software and/or database components installed on user device 110. For example, mobile application 120 may comprise an application or micro-app configured to leverage the resources of the larger operating system and associated hardware on user device 110, via a set of predetermined rules which govern the operations of various operating systems and hardware resources, as discussed further herein. In various embodiments, mobile application 120 may also comprise a web browser. Mobile application 120 may comprise a pinned certificate hardcoded into mobile application 120. The pinned certificate may comprise, for example, a leaf certificate digitally signed by an intermediate certificate, wherein the intermediate certificate is further digitally signed by a root certificate.

Mobile application 120 may allow a user, via user device 110, to interact with issuer system 140, via network 105-2. In that respect, mobile application 120 may require a secure login in order to grant the user access to issuer system 140. For example, the user may access issuer system 140, via mobile application 120, by entering secure login information (e.g., a user name and password, transaction account number, a biometric input (e.g., a fingerprint), etc.), or the like. Network 105-2 may be unsecured. As such, system 100 may also desire that a secure connection between mobile application 120 and network 105-2 is established prior to requiring the secure login. Mobile application 120 may comprise any suitable mobile application 120 wherein secured communications between a device and a server is desirable. For example, mobile application 120 may comprise a financial application wherein a user can view and access data regarding one or more transaction accounts, such as account balances, account charges or expenditures, or the like.

In various embodiments, user device 110 may download and install mobile application 120 from application store 130, via network 105-1. In various embodiments, mobile application 120 may also be pre-installed on user device 110. Application store 130 may comprise an application server or the like comprising various published mobile applications. For example, application store 130 may comprise the Apple App Store®, Google Play®, Amazon Appstore®, or any other similar online software marketplace. Application store 130 may display a graphic user interface (GUI) to allow a user, via user device 110, to select a mobile application to download and install on to user device 110. In response to receiving a request to download a mobile application, application store may transmit, via network 105-1, an installation package to user device 110. The installation package may download and install on user device 110.

In response to mobile application 120 being installed on user device 110, mobile application 120 may be configured to prompt user device 110 to perform operations to decouple the pinned certificate from mobile application 120, as discussed further herein. For example, in response to mobile application 120 completing the installation on user device 110 (or simultaneously with the installation), user device 110 may extract data indicating the pinned certificate from the installed mobile application 102. The extracted data may indicate the leaf certificate, intermediate certificate and/or root certificate of the pinned certificate (e.g., the decoupled pinned certificate), and/or a pinned certificate version number. User device 110 may transmit the decoupled pinned certificate to secure data storage 115.

In various embodiments, secure data storage 115 may be configured to securely store and maintain one or more decoupled pinned certificates. Secure data storage 115 may comprise any suitable type of database, and may store the data using any suitable technique described herein or known in the art. Secure data storage 115 may be located on user device 110 and/or may be in electronic and/or logical communication with user device 110 and mobile application 120. Secure data storage may employ White Box Cryptography (WBC), and/or any other suitable encryption, to securely store the decoupled pinned certificates.

In various embodiments, a user via user device 110 and mobile application 120 may desire to interact with issuer system 140, via network 105-2. As discussed herein, to ensure a secure communication between the parties, mobile application 120 may be configured to transmit a connection request to issuer system 140.

In various embodiments, issuer system 140 may be configured as a central hub for access to various components, databases, and modules of system 100. Issuer system 140 may comprise a sub-network, computer-based system, software component, and/or the like configured to provide an access point to various systems, engines, and components. In various embodiments, issuer system 140, account member database 145, certificate management system 150, and/or certificate repository 155 may comprise logical partitions of a backend server, network, or the like, or may comprise physically distinct components in electronic and/or logical communication with each other. For example, issuer system 140, account member database 145, certificate management system 150, and/or certificate repository 155 may be computer based, and may comprise a processor, a tangible non-transitory computer-readable memory, and/or a network interface, along with other suitable system software and hardware components. Instructions stored on the tangible non-transitory memory may allow the components to perform various functions, as described herein.

Issuer system 140 may be configured to allow user device 110, via mobile application 120 and network 105-2, access to various data in account member database 145. Account member database 145 may comprise any suitable type of database, and may store the data using any suitable technique described herein or known in the art. Account member database 145 may be located in issuer system 140 and/or may be in electronic and/or logical communication with issuer system 140. Account member database 145 may comprise data relating to transaction accounts, such as, for example, a transaction account number, user account access data (e.g., username, password, and/or the like), transaction account identifying information (e.g., owner address, city, state, zip code, etc.), a card security code (CSC) or a card verification value (CVV), transaction account balances, and/or other such similar data. Issuer system 140 may query account member database 145 to retrieve transaction account data to transmit to mobile application 120, via network 105-2, for review by a user via user device 110.

In various embodiments, in response to receiving the connection request from mobile application 120 (e.g., via network 105-2), issuer system 140 may be configured to perform one or more logical operations, as discussed further herein. For example, issuer system 140 may retrieve data regarding mobile application 120 and the pinned certificate. For example, issuer system 140 may query and retrieve an application version number, a pinned certificate version number, and the data regarding the pinned certificate (e.g., data indicating the leaf certificate, intermediate certificate, and root certificate of the pinned certificate). Issuer system 140 may transmit the retrieved data to certificate management system 150.

In various embodiments, certificate management system 150 may comprise hardware, software, or the like configured to manage, update, and validate certificates. Certificate management system 150 may comprise a sub-network, computer-based system, software component, and/or the like configured to provide an access point to various systems, engines, and components. Certificate management system 150 may be in logical and/or electronic communication with issuer system 140. Certificate management system 150 may comprise one or more components, modules, or the like configured to aid in managing, updating, and validating certificates, as discussed further herein. For example, certificate management system 150 may comprise one or more of a certificate verification module 153, a trusted CA certificate storage 154, a certificate updating module 157, and/or a certificate repository 155. Certificate verification module 153, trusted CA certificate storage 154, and/or certificate updating module 157 may comprise any suitable combination of software, hardware, and/or databases, as discussed further herein.

In various embodiments, certificate repository 155 may comprise any suitable software, hardware, or database, and may store the data using any suitable technique described herein or known in the art. Certificate repository 155 may be configured to store and maintain certificates and updated certificates corresponding to the pinned certificate initially hardcoded into mobile application 120. Certificate repository 155 may store the certificates grouped by and/or sorted by mobile application type, certificate version numbers, date of last update, or the like, as discussed further herein.

Figure 2:
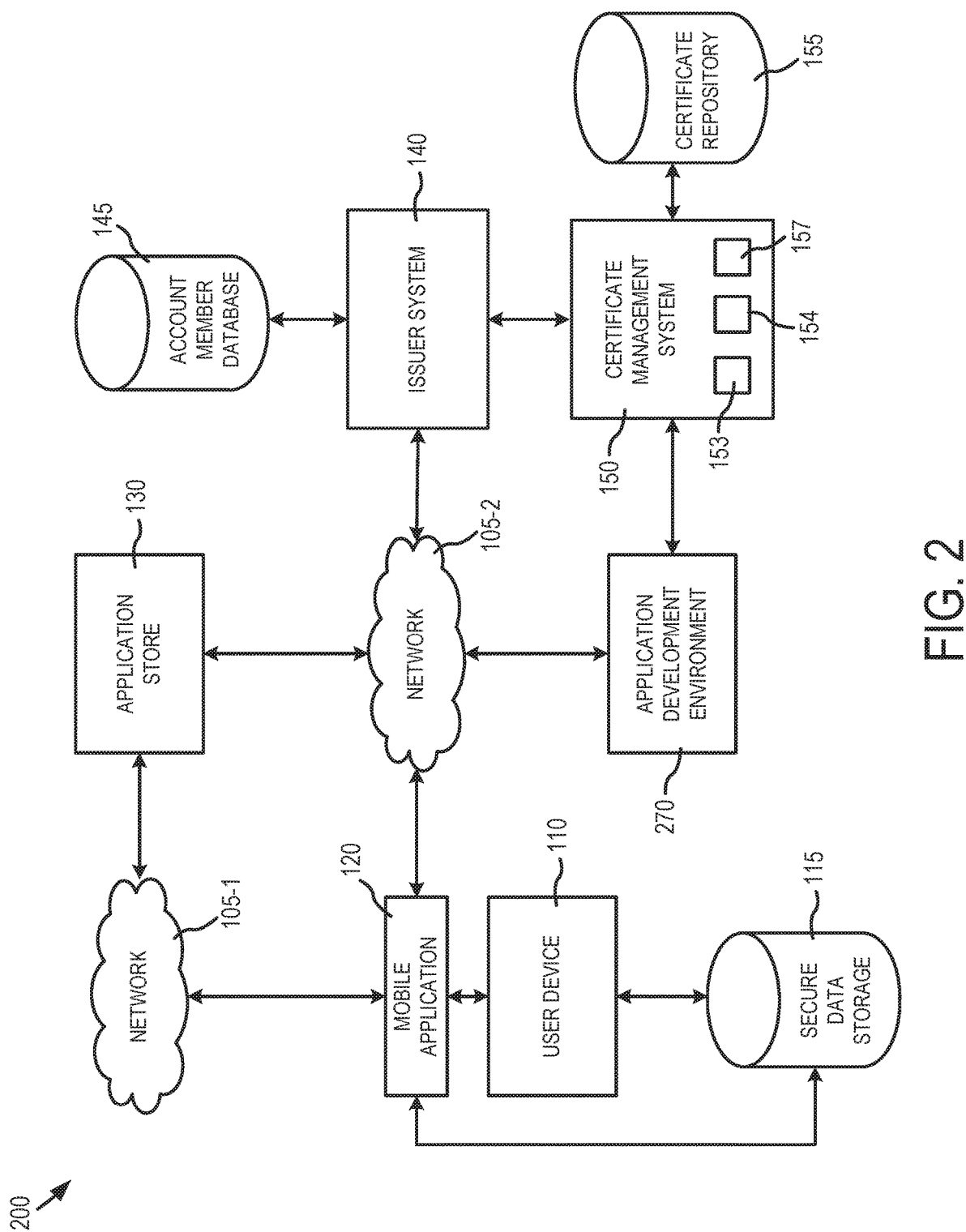
FIG. 2 is a block diagram illustrating various system components of a system for updating and publishing an application having a pinned certificate, in accordance with various embodiments.

Certificate repository 155 (e.g., via certificate management system 150), may be configured to receive certificates and updated certificates from application development environment, and/or from any other suitable source wherein applications are coded and developed and certificates are updated. For example, in accordance with various embodiments and with reference to FIG. 2, a system 200 may also comprise an application development environment 270. Application development environment 270 may comprise a sub-network, computer-based system, software component, and/or the like. Application development environment 270 may be configured to generate mobile applications having pinned certificates, publish mobile applications to application store 130, update certificates and transmit the updated certificates to certificate management system 150, and/or the like, as discussed further herein.

With reference again to FIG. 1, certificate verification module 153 may be configured to verify the pinned certificate received from issuer system 140. Certificate verification module 153 may verify the pinned certificate by decrypting the intermediate certificate and the root certificate used to sign the pinned certificate. For example, certificate verification module 153 may query trusted CA certificate storage 154 to identify the CA that signed the respective root certificate and/or the intermediate certificate. Trusted CA certificate storage 154 may comprise any suitable database, file structure, or the like, and may be configured to store and maintain trusted certificates and the public key associated with each certificate. In response to identifying the CA, certificate verification module 153 may be configured to retrieve the corresponding CA certificate from trusted CA certificate storage 154, and may retrieve the public key corresponding to the root certificate and/or the intermediate certificate. Certificate verification module 153 may decrypt the root certificate and/or the intermediate certificate using to the public key to validate that the signature is genuine.

In various embodiments, certificate management system 150 may also be configured to query certificate repository 155 based on at least one of the application version number, the pinned certificate version number, and/or the data regarding the pinned certificate. In response to determining that the pinned certificate is the current certificate for mobile application 120, certificate management system 150 may transmit data (e.g., a non-update status) to issuer system 140 to begin establishing a secure communication with user device 110, as discussed further herein. In response to determining that the pinned certificate is not the current certificate for mobile application 120, certificate management system 150 may retrieve the updated certificate. Certificate management system 150 may be configured to generate a certificate update data package based on the updated certificate. The certificate update data package may comprise data regarding the updated certificate, such as, for example, the updated certificate version number, and the new leaf certificate signed by the intermediate certificate further signed by the root certificate. The certificate update data package may comprise any suitable format. For example, the certificate update data package may be generated as a Binary Large Object (BLOB), as discussed further herein. Certificate management system 150 may transmit the certificate update data package to user device 110, via issuer system 140, network 105-1, and mobile application 120.

In various embodiments, certificate updating module 157 may be configured to provide updated certificates to certificate repository 155. For example, certificate updating module 157 may be configured to receive the certificate update request. Certificate management system 150 may receive the certificate update request from any suitable source, such as, for example, from application development environment 270. The certificate update request may be transmitted in response to a certificate update event, such as the expiration of the previous certificate, a discovered vulnerability in the certificate, and/or the like. The certificate update request may comprise data indicating the stored certificate to be updated (e.g., based on certificate version number, or the like) and the updated certificate. For example, the new certificate may comprise an updated leaf certificate that is digitally signed by an intermediate certificate and further digitally signed by a root certificate. For example, certificate updating module 157 may be configured to receive certificate update requests (e.g., via application development environment 270, with brief reference to FIG. 2), query certificate repository 155 to locate the certificate to be updated, and update the stored certificate to comprise the updated certificate data. Certificate repository 155 may track versions of each stored certificate such that the certificates can be rolled back in the event of a detected vulnerability, error, or the like in the updated certificate. In various embodiments, certificate repository 155 may also store a single certificate entry for each certificate, and may write over the previous stored certificate in response to receiving an update.

Figure 3:
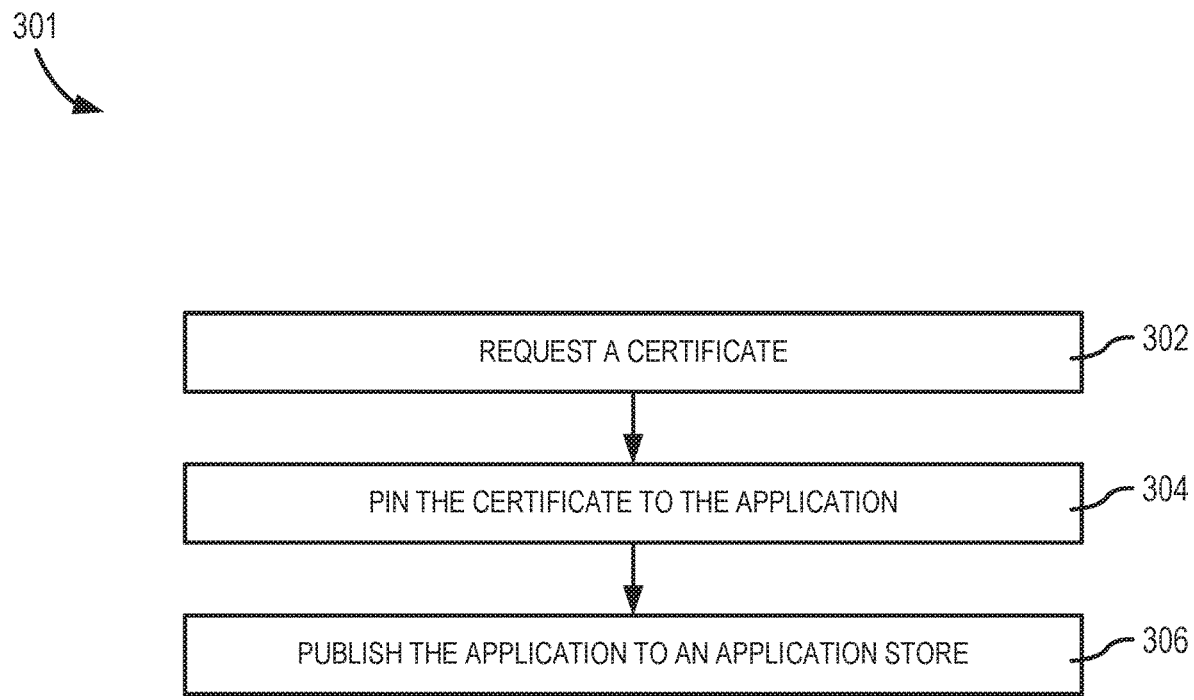
FIG. 3 illustrates a process flow for a method of pinning a certificate in an application, in accordance with various embodiments.
Figure 4:
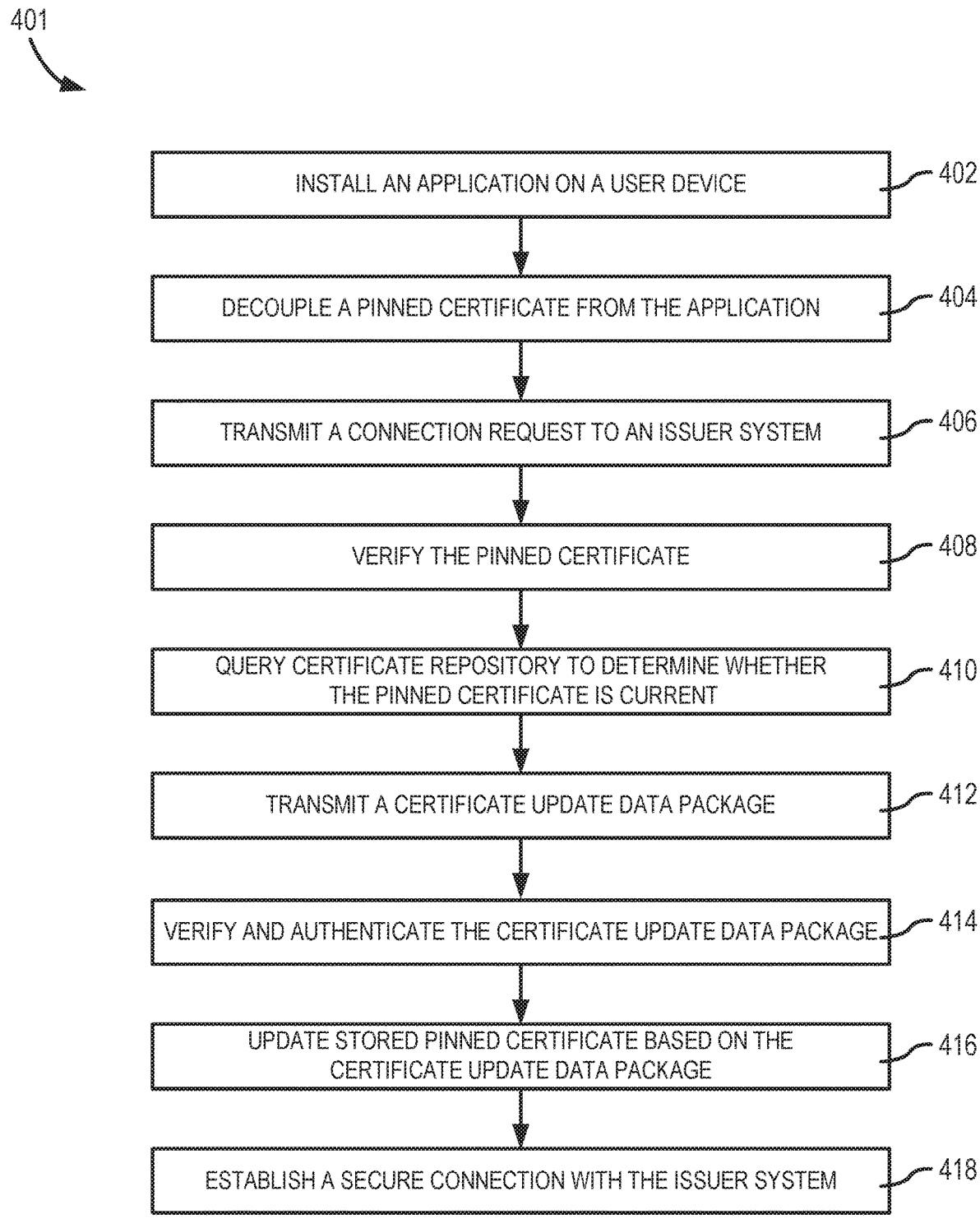
FIG. 4 illustrates a process flow for a method of decoupling and updating a pinned certificate on a user device, in accordance with various embodiments.
Figure 5:
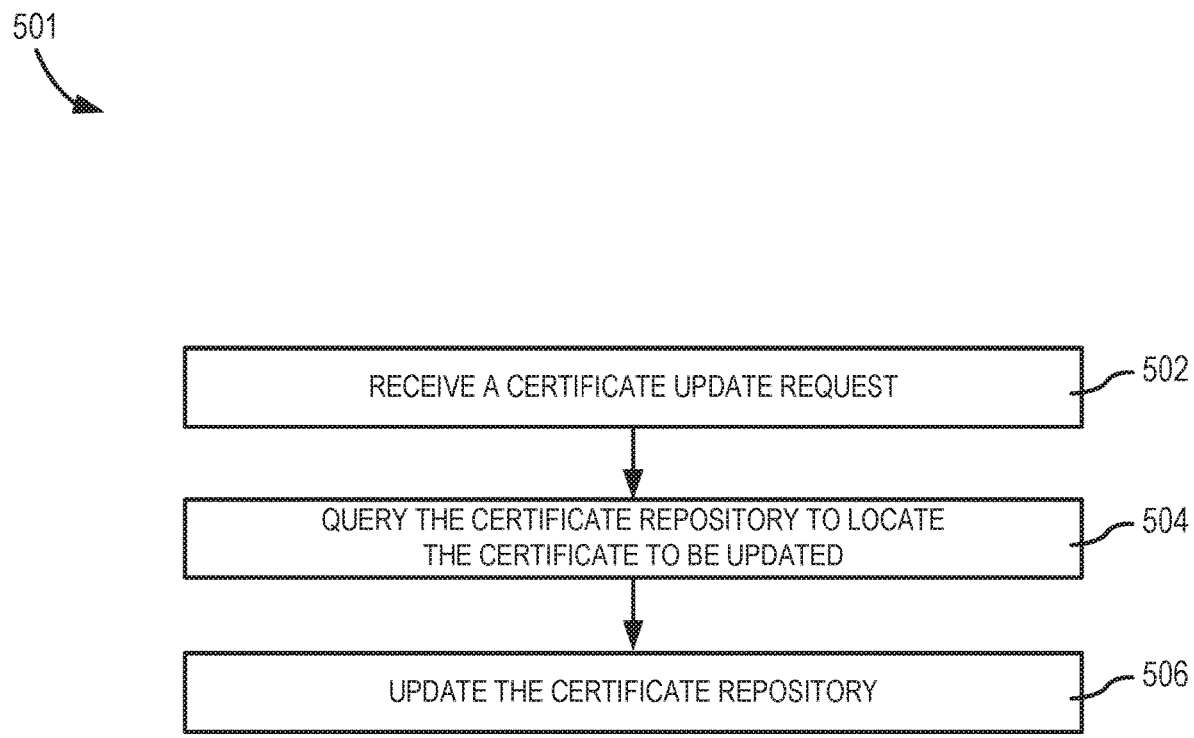
FIG. 5 illustrates a process flow for a method of updating a certificate in a certificate repository, in accordance with various embodiments.

Referring now to FIGS. 3-5, the process flows depicted are merely embodiments and are not intended to limit the scope of the disclosure. For example, the steps recited in any of the method or process descriptions may be executed in any order and are not limited to the order presented. It will be appreciated that the following description makes appropriate references not only to the steps and elements depicted in FIGS. 3-5, but also to the various system components as described above with reference to FIGS. 1 and 2.

In various embodiments, and with specific reference to FIG. 3, a method 301 for pinning a certificate in an application is disclosed. For example, the certificate may be pinned (e.g., embedded) in the application during a software development process or the like. Method 301 may comprise requesting a certificate (step 302). Application development environment 270 may be configured to request the certificate from certificate management system 150. The certificate may comprise a certificate chain, wherein a leaf certificate is signed by an intermediate certificate that is further signed by a root certificate. The leaf certificate may be generated by certificate management system 150. The intermediate certificate and the root certificate may be issued by one or more CAs, as discussed further herein. Certificate management system 150 may transmit the generated certificate to application development environment 270.

In various embodiments, method 301 may comprise pinning the certificate to the application (step 304). For example, during development and coding of mobile application 120, data regarding the certificate received in step 302 may be hardcoded and embedded into mobile application 120 in a certificate pinning process. Method 301 may comprise publishing the application to an application store (step 306). In that regard, application development environment 270 may be configured to transmit data regarding mobile application 120 to application store 130, via network 105-2. For example, application development environment 270 may transmit a web link to download mobile application 120, an installation package for download, and executable file for download, and/or the like.

In various embodiments, and with specific reference to FIG. 4, a method 401 for decoupling and updating a pinned certificate on a user device is disclosed. For example, the pinned certificate may be decoupled in response to installing a mobile application on the user device, as discussed further herein. The pinned certificate may be updated in response to a server determining, while establishing a secured connected, that the pinned certificate is not current, as discussed further herein.

In various embodiments, method 401 may comprise installing an application on a user device (402). User device 110 may be configured to install mobile application 120. For example, user device 110 may request an installation package from application store 130, via network 105-1. Application store 130 may transmit the installation package to user device 110, via network 105-1. The installation package may comprise an executable file or the like, and may begin installation of mobile application 120 on user device 110. Mobile application 120 may comprise a pinned certificate hardcoded into mobile application 120. Method 401 may comprise decoupling a pinned certificate from the application (step 404). User device 110 may be configured to decouple the pinned certificate from mobile application 120. For example, in response to mobile application 120 completing the installation on user device 110 (or simultaneously with the installation), user device 110 may extract data indicating the pinned certificate from the installed mobile application 102. The extracted data may indicate the leaf certificate, intermediate certificate, and root certificate of the pinned certificate (e.g., the decoupled pinned certificate), and/or a pinned certificate version number. User device 110 may transmit the decoupled pinned certificate to secure data storage 115.

In various embodiments, method 401 may comprise transmitting a connection request to the issuer system (step 406). Mobile application 120 may be configured to transmit the connection request to issuer system 140, via network 105-2. For example, mobile application 120 may transmit the connection request in response to a user interacting with user device 110. For example, a user may access mobile application 120 during a login process. In response to receiving the connection request, issuer system 140 may query user device 110 (e.g., via mobile application 120 and network 105-2) to retrieve data regarding mobile application 120 and the pinned certificate. For example, issuer system 140 may query and retrieve an application version number, a pinned certificate version number, and the data regarding the pinned certificate (e.g., data indicating the leaf certificate, intermediate certificate, and root certificate of the pinned certificate).

In various embodiments, method 401 may comprise verifying the pinned certificate (step 408). Certificate management system 150 may be configured to verify the pinned certificate. For example, certificate verification module 153 in certificate management system 150 may be configured to verify the pinned certificate. In response to retrieving the application version number, the pinned certificate version number, and the data regarding the pinned certificate from user device 110, issuer system 140 may transmit the data to certificate management system 150. Certificate verification module 153 may verify the pinned certificate by decrypting the intermediate certificate and the root certificate used to sign the pinned certificate. For example, certificate verification module 153 may query trusted CA certificate storage 154 to identify the CA that signed the respective root certificate and/or the intermediate certificate. In response to identifying the CA, certificate verification module 153 may retrieve the corresponding CA certificate from trusted CA certificate storage 154, and may retrieve the public key corresponding to the root certificate and/or the intermediate certificate. Certificate verification module 153 may decrypt the root certificate and/or the intermediate certificate using to the public key to validate that the signature is genuine.

In various embodiments, method 401 may comprise querying a certificate repository to determine whether the pinned certificate is current (step 410). Certificate management system 150 may be configured to query certificate repository 155. For example, certificate management system 150 may query certificate repository 155 based on at least one of the application version number, the pinned certificate version number, and/or the data regarding the pinned certificate. For example, certificate repository 155 may store the certificates grouped by and/or sorted by mobile application type, certificate version numbers, date of last update, or the like. In response to determining that the pinned certificate is the current certificate for mobile application 120, certificate management system 150 may transmit data (e.g., a non-update status) to issuer system 140 to begin establishing a secure communication with user device 110, as discussed further herein. In response to determining that the pinned certificate is not the current certificate for mobile application 120, certificate management system 150 may retrieve the updated certificate. Certificate management system 150 may be configured to generate a certificate update data package based on the updated certificate. The certificate update data package may comprise data regarding the updated certificate, such as, for example, the updated certificate version number, and the new leaf certificate signed by the intermediate certificate further signed by the root certificate. The certificate update data package may comprise any suitable format. For example, the certificate update data package may be generated as a Binary Large Object (BLOB), as discussed further herein. Method 401 may comprise transmitting a certificate update data package (step 412). Certificate management system 150 may transmit the certificate update data package to user device 110, via issuer system 140, network 105-1, and mobile application 120.

In various embodiments, method 401 may comprise verifying and/or authenticating the certificate update data package (step 414). Mobile application 120 may be configured to verify and authenticate the certificate update data package in response to receiving the data from certificate management system 150, via issuer system 140 and network 105-1. Mobile application 120 may verify and authenticate the certificate update data package using any suitable technique. For example, mobile application 120 may user a corresponding public key to verify and validate the digital signatures of the intermediate certificate and the root certificate. Mobile application 120 may also be configured to decrypt the certificate update data package in various embodiments wherein the certificate update data package is encrypted.

Method 401 may comprise updating the stored pinned certificate based on the certificate update data package (step 416). Mobile application 120 may be configured to update the stored pinned certificate in secure data storage 115. For example, mobile application 120 may query secure data storage 115 for the stored pinned certificate to be updated. In response to locating the corresponding stored pinned certificate, mobile application 120 may update secure data storage 115 to reflect the data contained in the certificate update data package.

In various embodiments, method 401 may comprise establishing a secure connection with the issuer system (step 418). Mobile application 120 may be configured to establish the secure connection with issuer system 140. In response to updating the pinned certificate with the updated certificate data, mobile application 120 may prompt the user to enter secure login information (e.g., a user name and password, transaction account number, a biometric input (e.g., a fingerprint), etc.), or the like, via user device 110. Mobile application 120 may transmit the secure login information to issuer system 140, via network 105-2 to establish the secure connection.

In various embodiments, and with specific reference to FIG. 5, a method 501 for updating a certificate in a certificate repository is disclosed. Method 501 may comprise receiving a certificate update request (step 502). Certificate management system 150 may be configured to receive the certificate update request. For example, certificate updating module 157 may be configured to receive the certificate update request. Certificate management system 150 may receive the certificate update request from any suitable source, such as, for example, from application development environment 270. The certificate update request may be transmitted in response to a certificate update event, such as the expiration of the previous certificate, a discovered vulnerability in the certificate, and/or the like. The certificate update request may comprise data indicating the stored certificate to be updated (based on certificate version number, or the like) and the updated certificate. For example, the new certificate may comprise an updated leaf certificate that is digitally signed by an intermediate certificate and further digitally signed by a root certificate.

In various embodiments, method 501 may comprise querying the certificate repository to locate the certificate to be updated (step 504). Certificate management system 150 may be configured to query certificate repository 155. For example, certificate updating module 157 may be configured to query certificate repository 155. Certificate management system 150 may query certificate repository 155 based on the based on certificate version number and/or any other identifying data that could be used to locate the certificate in certificate repository 155. Method 501 may comprise updating the certificate repository (step 506). In response to locating the certificate in certificate repository 155, certificate management system 150 may update the stored certificate to comprise the updated certificate data. For example, certificate repository 155 may track versions of each stored certificate such that the certificates can be rolled back in the event of a detected vulnerability, error, or the like in the updated certificate. In various embodiments, certificate repository 155 may also store a single certificate entry for each certificate, and may write over the previous stored certificate in response to receiving an update.

The disclosure and claims do not describe only a particular outcome of decoupling and updating a pinned certificate on a user device, but the disclosure and claims include specific rules for implementing the outcome of decoupling and updating a pinned certificate on a user device and that render information into a specific format that is then used and applied to create the desired results of decoupling and updating a pinned certificate on a user device, as set forth in *McRO, Inc. v. Bandai Namco Games America Inc.* (Fed. Cir. case number 15-1080, Sep. 13, 2016). In other words, the outcome of decoupling and updating a pinned certificate on a user device can be performed by many different types of rules and combinations of rules, and this disclosure includes various embodiments with specific rules. While the absence of complete preemption may not guarantee that a claim is eligible, the disclosure does not sufficiently preempt the field of warranty enriched transactions at all. The disclosure acts to narrow, confine, and otherwise tie down the disclosure so as not to cover the general abstract idea of just decoupling and updating a pinned certificate on a user device. Significantly, other systems and methods exist for decoupling and updating a pinned certificate on a user device, so it would be inappropriate to assert that the claimed invention preempts the field or monopolizes the basic tools of decoupling and updating a pinned certificate on a user device. In other words, the disclosure will not prevent others from decoupling and updating a pinned certificate on a user device, because other systems are already performing the functionality in different ways than the claimed invention. Moreover, the claimed invention includes an inventive concept that may be found in the non-conventional and non-generic arrangement of known, conventional pieces, in conformance with *Bascom v. AT&T Mobility*, 2015-1763 (Fed. Cir. 2016). The disclosure and claims go way beyond any conventionality of any one of the systems in that the interaction and synergy of the systems leads to additional functionality that is not provided by any one of the systems operating independently. The disclosure and claims may also include the interaction between multiple different systems, so the disclosure cannot be considered an implementation of a generic computer, or just "apply it" to an abstract process. The disclosure and claims may also be directed to improvements to software with a specific implementation of a solution to a problem in the software arts.

In various embodiments, the systems and methods may include alerting a subscriber when their computer is offline. With brief reference to FIG. 1, system 100 may include generating customized information, via mobile application 120, and alerting a remote subscriber that the information can be accessed from their computer (e.g., via user device 110). The alerts are generated by filtering received information, building information alerts and formatting the alerts into data blocks based upon subscriber preference information. The data blocks are transmitted to the subscriber's wireless device (e.g., user device 110), which, when connected to the computer, causes the computer to auto-launch an application to display the information alert and provide access to more detailed information about the information alert. More particularly, the method may comprise providing a viewer application to a subscriber for installation on the remote subscriber computer; receiving information at a transmission server sent from a data source over the Internet, the transmission server comprising a microprocessor and a memory that stores the remote subscriber's preferences for information format, destination address, specified information, and transmission schedule, wherein the microprocessor filters the received information by comparing the received information to the specified information; generates an information alert from the filtered information that contains a name, a price and a universal resource locator (URL), which specifies the location of the data source; formats the information alert into data blocks according to said information format; and transmits the formatted information alert over a wireless communication channel to a wireless device associated with a subscriber based upon the destination address and transmission schedule, wherein the alert activates the application to cause the information alert to display on the remote subscriber computer and to enable connection via the URL to the data source over the Internet when the wireless device is locally connected to the remote subscriber computer and the remote subscriber computer comes online.

In various embodiments, the system and method may include a graphical user interface on mobile application 120 (e.g., via user device 110) for dynamically relocating/rescaling obscured textual information of an underlying window to become automatically viewable to the user. By permitting textual information to be dynamically relocated based on an overlap condition, the computer's ability to display information is improved. More particularly, the method for dynamically relocating textual information within an underlying window displayed in a graphical user interface may comprise displaying a first window containing textual information in a first format within a graphical user interface on a computer screen; displaying a second window within the graphical user interface; constantly monitoring the boundaries of the first window and the second window to detect an overlap condition where the second window overlaps the first window such that the textual information in the first window is obscured from a user's view; determining the textual information would not be completely viewable if relocated to an unobstructed portion of the first window; calculating a first measure of the area of the first window and a second measure of the area of the unobstructed portion of the first window; calculating a scaling factor which is proportional to the difference between the first measure and the second measure; scaling the textual information based upon the scaling factor; automatically relocating the scaled textual information, by a processor, to the unobscured portion of the first window in a second format during an overlap condition so that the entire scaled textual information is viewable on the computer screen by the user; and automatically returning the relocated scaled textual information, by the processor, to the first format within the first window when the overlap condition no longer exists.

In various embodiments, the system may also include isolating and removing malicious code from electronic messages (e.g., email) to prevent a computer (e.g., user device 110) from being compromised, for example by being infected with a computer virus. The system may scan, via mobile application 120 for example, electronic communications for malicious computer code and clean the electronic communication before it may initiate malicious acts. The system operates by physically isolating a received electronic communication in a "quarantine" sector of the computer memory. A quarantine sector is a memory sector created by the computer's operating system such that files stored in that sector are not permitted to act on files outside that sector. When a communication containing malicious code is stored in the quarantine sector, the data contained within the communication is compared to malicious code-indicative patterns stored within a signature database. The presence of a particular malicious code-indicative pattern indicates the nature of the malicious code. The signature database further includes code markers that represent the beginning and end points of the malicious code. The malicious code is then extracted from malicious code-containing communication. An extraction routine is run by a file parsing component of the processing unit. The file parsing routine performs the following operations: scan the communication for the identified beginning malicious code marker; flag each scanned byte between the beginning marker and the successive end malicious code marker; continue scanning until no further beginning malicious code marker is found; and create a new data file by sequentially copying all non-flagged data bytes into the new file, which thus forms a sanitized communication file. The new, sanitized communication is transferred to a non-quarantine sector of the computer memory. Subsequently, all data on the quarantine sector is erased. More particularly, the system includes a method for protecting a computer from an electronic communication containing malicious code by receiving an electronic communication containing malicious code in a computer with a memory having a boot sector, a quarantine sector and a non-quarantine sector; storing the communication in the quarantine sector of the memory of the computer, wherein the quarantine sector is isolated from the boot and the non-quarantine sector in the computer memory, where code in the quarantine sector is prevented from performing write actions on other memory sectors; extracting, via file parsing, the malicious code from the electronic communication to create a sanitized electronic communication, wherein the extracting comprises scanning the communication for an identified beginning malicious code marker, flagging each scanned byte between the beginning marker and a successive end malicious code marker, continuing scanning until no further beginning malicious code marker is found, and creating a new data file by sequentially copying all non-flagged data bytes into a new file that forms a sanitized communication file; transferring the sanitized electronic communication to the non-quarantine sector of the memory; and deleting all data remaining in the quarantine sector.

In various embodiments, system 100 may also address the problem of retaining control over customers during affiliate purchase transactions, using a system for co-marketing the "look and feel" of the host web page with the product-related content information of the advertising merchant's web page (e.g., via mobile application 120). System 100 can be operated by a third-party outsource provider, who acts as a broker between multiple hosts and merchants. Prior to implementation, a host places links to a merchant's webpage on the host's web page. The links are associated with product-related content on the merchant's web page. Additionally, the outsource provider system stores the "look and feel" information from each host's web pages in a computer data store, which is coupled to a computer server. The "look and feel" information includes visually perceptible elements such as logos, colors, page layout, navigation system, frames, mouse-over effects or other elements that are consistent through some or all of each host's respective web pages. A customer who clicks on an advertising link, via user device 110, for example, is not transported from the host web page to the merchant's web page, but instead is redirected to a composite web page that combines product information associated with the selected item and visually perceptible elements of the host web page. The outsource provider's server responds by first identifying the host web page where the link has been selected and retrieving the corresponding stored "look and feel" information. The server constructs a composite web page using the retrieved "look and feel" information of the host web page, with the product-related content embedded within it, so that the composite web page is visually perceived by the customer as associated with the host web page. The server then transmits and presents this composite web page to the customer so that she effectively remains on the host web page to purchase the item without being redirected to the third party merchant affiliate. Because such composite pages are visually perceived by the customer as associated with the host web page, they give the customer the impression that she is viewing pages served by the host. Further, the customer is able to purchase the item without being redirected to the third party merchant affiliate, thus allowing the host to retain control over the customer. This system enables the host to receive the same advertising revenue streams as before but without the loss of visitor traffic and potential customers. More particularly, the system may be useful in an outsource provider serving web pages offering commercial opportunities. The computer store containing data, for each of a plurality of first web pages, defining a plurality of visually perceptible elements, which visually perceptible elements correspond to the plurality of first web pages; wherein each of the first web pages belongs to one of a plurality of web page owners; wherein each of the first web pages displays at least one active link associated with a commerce object associated with a buying opportunity of a selected one of a plurality of merchants; and wherein the selected merchant, the outsource provider, and the owner of the first web page displaying the associated link are each third parties with respect to one other; a computer server at the outsource provider, which computer server is coupled to the computer store and programmed to: receive from the web browser of a computer user a signal indicating activation of one of the links displayed by one of the first web pages; automatically identify as the source page the one of the first web pages on which the link has been activated; in response to identification of the source page, automatically retrieve the stored data corresponding to the source page; and using the data retrieved, automatically generate and transmit to the web browser a second web page that displays: information associated with the commerce object associated with the link that has been activated, and the plurality of visually perceptible elements visually corresponding to the source page.

Phrases and terms similar to "financial institution" or "transaction account issuer" may include any entity that offers transaction account services. Although often referred to as a "financial institution," the financial institution may represent any type of bank, lender or other type of account issuing institution, such as credit card companies, card sponsoring companies, or third party issuers under contract with financial institutions. It is further noted that other participants may be involved in some phases of the transaction, such as an intermediary settlement institution.

Phrases and terms similar to "payment vehicle," "financial transaction instrument," "transaction instrument" or "transaction card" may be used interchangeably throughout to refer to a financial instrument. As used herein, an account code may or may not be associated with a physical financial instrument.

Phrases and terms similar to "transaction account" may include any account that may be used to facilitate a financial transaction. For example, a transaction account as used herein may refer to an account associated with an open account or a closed account system (as described herein). The transaction account may exist in a physical or non-physical embodiment. For example, a transaction account may be distributed in non-physical embodiments such as an account number, frequent-flyer account, telephone calling account, and/or the like. Furthermore, a physical embodiment of a transaction account may be distributed as a financial instrument, such as, for example, a credit card, debit card, and/or the like.

As used herein, "satisfy", "meet", "match", "associated with" or similar phrases may include an identical match, a partial match, meeting certain criteria, matching a subset of data, a correlation, satisfying certain criteria, a correspondence, an association, an algorithmic relationship and/or the like. Similarly, as used herein, "authenticate" or similar terms may include an exact authentication, a partial authentication, authenticating a subset of data, a correspondence, satisfying certain criteria, an association, an algorithmic relationship and/or the like.

Terms and phrases similar to "associate" and/or "associating" may include tagging, flagging, correlating, using a look-up table or any other method or system for indicating or creating a relationship between elements such as, for example, (i) a transaction account and (ii) an item (e.g., offer, reward, discount) and/or digital channel. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via an email, text, post, social network input and/or any other method known in the art.

The system or any components may integrate with system integration technology such as, for example, the ALEXA® system developed by AMAZON®. ALEXA® is a cloud-based voice service that can help with tasks, entertainment, general information and more. All AMAZON® ALEXA® devices, such as the AMAZON® Echo, AMAZON® Dot, AMAZON® Tap, AMAZON® Fire TV, have access to the ALEXA® Voice Service. The system may receive voice commands via its voice activation technology, and activate other functions, control smart devices and/or gather information. For example, music, emails, texts, calling, questions answered, home improvement information, smart home communication/activation, games, shopping, making to-do lists, setting alarms, streaming podcasts, playing audio-books, and providing weather, traffic, and other real time information, such as news. The system may allow the user, via user device 110, to access information about eligible accounts linked to an online account across all ALEXA®-enabled devices.

The phrases consumer, customer, user, account holder, account affiliate, cardmember or the like shall include any person, entity, business, government organization, business, software, hardware, machine associated with a transaction account, buys merchant offerings offered by one or more merchants using the account and/or who is legally designated for performing transactions on the account, regardless of whether a physical card is associated with the account. For example, the cardmember may include a transaction account owner, a transaction account user, an account affiliate, a child account user, a subsidiary account user, a beneficiary of an account, a custodian of an account, and/or any other person or entity affiliated or associated with a transaction account.

Phrases and terms similar to "account", "account number", "account code", "consumer transaction account", "consumer transaction account number", or "consumer account" as used herein, may include any device, code (e.g., one or more of an authorization/access code, personal identification number ("PIN"), Internet code, other identification code, and/or the like), number, letter, symbol, digital certificate, smart chip, digital signal, analog signal, biometric or other identifier/indicia suitably configured to allow the consumer to access, interact with or communicate with the system. The account number may optionally be located on or associated with a rewards account, charge account, credit account, debit account, prepaid account, telephone card, embossed card, smart card, magnetic stripe card, bar code card, transponder, radio frequency card or an associated account.

The account number may be distributed and stored in any form of plastic, electronic, magnetic, radio frequency, wireless, audio and/or optical device capable of transmitting or downloading data from itself to a second device. A consumer transaction account number may be, for example, a sixteen-digit account number, although each credit provider has its own numbering system, such as the fifteen-digit numbering system used by AMERICAN EXPRESS®. Each company's account numbers comply with that company's standardized format such that the company using a fifteen-digit format will generally use three-spaced sets of numbers, as represented by the number "0000 000000 00000". The first five to seven digits are reserved for processing purposes and identify the issuing bank, account type, etc. In this example, the last (fifteenth) digit is used as a sum check for the fifteen digit number. The intermediary eight-to-eleven digits are used to uniquely identify the consumer. A merchant bank account number may be, for example, any number or alpha-numeric characters that identify a particular merchant for purposes of account acceptance, account reconciliation, reporting, or the like.

In various embodiments, an account number may identify a consumer. In addition, in various embodiments, a consumer may be identified by a variety of identifiers, including, for example, an email address, a telephone number, a cookie id, a radio frequency identifier (RFID), a biometric, and the like.

As used herein an "identifier" may be any suitable identifier that uniquely identifies an item. For example, the identifier may be a globally unique identifier ("GUID"). The GUID may be an identifier created and/or implemented under the universally unique identifier standard. Moreover, the GUID may be stored as 128-bit value that can be displayed as 32 hexadecimal digits. The identifier may also include a major number, and a minor number. The major number and minor number may each be 16 bit integers.

As used herein, big data may refer to partially or fully structured, semi-structured, or unstructured data sets including millions of rows and hundreds of thousands of columns. A big data set may be compiled, for example, from a history of purchase transactions over time, from web registrations, from social media, from records of charge ("ROC"), from summaries of charges ("SOC"), from internal data, or from other suitable sources. Big data sets may be compiled without descriptive metadata such as column types, counts, percentiles, or other interpretive-aid data points.

A record of charge (or "ROC") may comprise any transaction or transaction data. The ROC may be a unique identifier associated with a transaction. Record of Charge (ROC) data includes important information and enhanced data. For example, a ROC may contain details such as location, merchant name or identifier, transaction amount, transaction date, account number, account security pin or code, account expiry date, and the like for the transaction. Such enhanced data increases the accuracy of matching the transaction data to the receipt data. Such enhanced ROC data is NOT equivalent to transaction entries from a banking statement or transaction account statement, which is very limited to basic data about a transaction. Furthermore, a ROC is provided by a different source, namely the ROC is provided by the merchant to the transaction processor. In that regard, the ROC is a unique identifier associated with a particular transaction. A ROC is often associated with a Summary of Charges (SOC). The ROCs and SOCs include information provided by the merchant to the transaction processor, and the ROCs and SOCs are used in the settlement process with the merchant. A transaction may, in various embodiments, be performed by a one or more members using a transaction account, such as a transaction account associated with a gift card, a debit card, a credit card, and the like.

Distributed computing cluster may be, for example, a Hadoop® cluster configured to process and store big data sets with some of nodes comprising a distributed storage system and some of nodes comprising a distributed processing system. In that regard, distributed computing cluster may be configured to support a Hadoop® distributed file system (HDFS) as specified by the Apache Software Foundation at http://hadoop.apache.org/docs/. For more information on big data management systems, see U.S. Ser. No. 14/944,902 titled INTEGRATED BIG DATA INTERFACE FOR MULTIPLE STORAGE TYPES and filed on Nov. 18, 2015; U.S. Ser. No. 14/944,979 titled SYSTEM AND METHOD FOR READING AND WRITING TO BIG DATA STORAGE FORMATS and filed on Nov. 18, 2015; U.S. Ser. No. 14/945,032 titled SYSTEM AND METHOD FOR CREATING, TRACKING, AND MAINTAINING BIG DATA USE CASES and filed on Nov. 18, 2015; U.S. Ser. No. 14/944,849 titled SYSTEM AND METHOD FOR AUTOMATICALLY CAPTURING AND RECORDING LINEAGE DATA FOR BIG DATA RECORDS and filed on Nov. 18, 2015; U.S. Ser. No. 14/944,898 titled SYSTEMS AND METHODS FOR TRACKING SENSITIVE DATA IN A BIG DATA ENVIRONMENT and filed on Nov. 18, 2015; and U.S. Ser. No. 14/944,961 titled SYSTEM AND METHOD TRANSFORMING SOURCE DATA INTO OUTPUT DATA IN BIG DATA ENVIRONMENTS and filed on Nov. 18, 2015, the contents of each of which are herein incorporated by reference in their entirety.

Any communication, transmission and/or channel discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website or device (e.g., Facebook, YOUTUBE®, APPLE® TV®, PANDORA®, XBOX®, SONY® PLAYSTATION®), a uniform resource locator ("URL"), a document (e.g., a MICROSOFT® Word® document, a MICROSOFT® Excel® document, an ADOBE® .pdf document, etc.), an "ebook," an "emagazine," an application or microapplication (as described herein), an SMS or other type of text message, an email, Facebook® message, Twitter® tweet and/or message, MMS, and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, MYSPACE®, LINKEDIN®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

A "consumer profile" or "consumer profile data" may comprise any information or data about a consumer that describes an attribute associated with the consumer (e.g., a preference, an interest, demographic information, personally identifying information, and the like).

In various embodiments, the methods described herein are implemented using the various particular machines described herein. The methods described herein may be implemented using the herein particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, OS2, UNIX®, LINUX®, SOLARIS®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system may also include a main memory, such as for example random access memory (RAM), and may also include a secondary memory. The secondary memory may include, for example, a hard disk drive and/or a removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

In various embodiments, the server may include application servers (e.g. WEB SPHERE, WEB LOGIC, JBOSS, EDB® Postgres Plus Advanced Server® (PPAS), etc.). In various embodiments, the server may include web servers (e.g. APACHE, IIS, GWS, SUN JAVA® SYSTEM WEB SERVER).

A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as IPADS®, IMACS®, and MAC-BOOKS®, kiosks, terminals, point of sale ("POS") devices and/or terminals, televisions, or any other device capable of receiving data over a network. A web-client may run MICROSOFT® INTERNET EXPLORER®, MOZILLA® FIREFOX®, GOOGLE® CHROME®, APPLE® Safari, or any other of the myriad software packages available for browsing the internet.

As those skilled in the art will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In various embodiments, access is through a network or the Internet through a commercially-available web-browser software package.

As those skilled in the art will appreciate, a web client includes an operating system (e.g., WINDOWS® OS, OS2, UNIX® OS, LINUX® OS, SOLARIS®, MacOS, and/or the like) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In various embodiments, access is through a network or the Internet through a commercially available web-browser software package. A web client may implement security protocols such as Secure Sockets Layer (SSL) and Transport Layer Security ("TLS"). A web client may implement several application layer protocols including http, https, ftp, and sftp.

In various embodiments, components, modules, and/or engines of system 100 may be implemented as micro-applications or micro-apps. Micro-apps are typically deployed in the context of a mobile operating system, including for example, a WINDOWS® mobile operating system, an ANDROID® Operating System, APPLE® IOS®, a BLACKBERRY® operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and communicates a detected input from the hardware to the micro-app.

As used herein, "issue a debit", "debit" or "debiting" refers to either causing the debiting of a stored value or prepaid card-type financial account, or causing the charging of a credit or charge card-type financial account, as applicable.

Phrases and terms similar to an "item" may include any good, service, information, experience, entertainment, data, offer, discount, rebate, points, virtual currency, content, access, rental, lease, contribution, account, credit, debit, benefit, right, reward, points, coupons, credits, monetary equivalent, anything of value, something of minimal or no value, monetary value, non-monetary value and/or the like. Moreover, the "transactions" or "purchases" discussed herein may be associated with an item. Furthermore, a "reward" may be an item.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, blockchain, or object-oriented structure and/or any other database configurations. The databases may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2 by IBM® (Armonk, N.Y.), various database products available from ORACLE® Corporation (Redwood Shores, Calif.), MICROSOFT® Access® or MICROSOFT® SQL Server® by MICROSOFT® Corporation (Redmond, Wash.), MySQL by MySQL AB (Uppsala, Sweden), MongoDB®, Redis®, Apache Cassandra®, HBase by APACHE®, MapR-DB, or any other suitable database product. Moreover, the databases may be organized in any suitable manner, for example, as data tables or lookup tables. Each record may be a single file, a series of files, a linked series of data fields or any other data structure.

The blockchain structure may include a distributed database that maintains a growing list of data records. The blockchain may provide enhanced security because each block may hold individual transactions and the results of any blockchain executables. Each block may contain a timestamp and a link to a previous block. Blocks may be linked because each block may include the hash of the prior block in the blockchain. The linked blocks form a chain, with only one successor block allowed to link to one other predecessor block for a single chain. Forks may be possible where divergent chains are established from a previously uniform blockchain, though typically only one of the divergent chains will be maintained as the consensus chain. For more information on blockchain-based payment networks, see U.S. application Ser. No. 15/266,350 titled SYSTEMS AND METHODS FOR BLOCKCHAIN BASED PAYMENT NETWORKS and filed on Sep. 15, 2016, U.S. application Ser. No. 15/682,180 titled SYSTEMS AND METHODS FOR DATA FILE TRANSFER BALANCING AND CONTROL ON BLOCKCHAIN and filed Aug. 21, 2017, and U.S. application Ser. No. 15/728,086 titled SYSTEMS AND METHODS FOR LOYALTY POINT DISTRIBUTION and filed Oct. 9, 2017, the contents of which are each incorporated by reference in their entirety.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may then be designated as a key field in a plurality of related data tables and the data tables may be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN. 1) as in ISO/IEC 8824 and 8825; and/or other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored in association with the system or external to but affiliated with the system. The BLOB method may store data sets as ungrouped data elements formatted as a block of binary via a fixed memory offset using fixed storage allocation, circular queue techniques, or best practices with respect to memory management (e.g., paged memory, least recently used, etc.). By using BLOB methods, the ability to store various data sets that have different formats facilitates the storage of data, in the database or associated with system, by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data in the database or system. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a standalone interaction device configured to add, delete, modify, or augment the data in accordance with the header or trailer. As such, in one embodiment, the header or trailer is not stored on the transaction device along with the associated issuer-owned data but instead the appropriate action may be taken by providing to the user at the standalone device, the appropriate option for the action to be taken. The system may contemplate a data storage arrangement wherein the header or trailer, or header or trailer history, of the data is stored on the system, device, or transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, GPG (GnuPG), HPE Format-Preserving Encryption (FPE), Voltage, and symmetric and asymmetric cryptosystems. The systems and methods may also incorporate SHA series cryptographic methods as well as ECC (Elliptic Curve Cryptography) and other Quantum Readable Cryptography Algorithms under development.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

Firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within a web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface which is accessible by users. In one embodiment, the MICROSOFT® INTERNET INFORMATION SERVICES® (IIS), MICROSOFT® Transaction Server ("MTS"), and MICROSOFT® SQL Server, are used in conjunction with the MICROSOFT® operating system, MICROSOFT® web server software, a MICROSOFT® SQL Server database system, and a MICROSOFT® Commerce Server. Additionally, components such as Access or MICROSOFT® SQL Server, ORACLE®, Sybase, Informix MySQL, Interbase, etc., may be used to provide an Active Data Object ("ADO") compliant database management system. In one embodiment, the Apache web server is used in conjunction with a Linux operating system, a MySQL database, and the Perl, PHP, Ruby, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT, active server pages ("ASP"), common gateway interface scripts ("CGI"), extensible markup language ("XML"), dynamic HTML, cascading style sheets ("CSS"), AJAX (Asynchronous JAVASCRIPT And XML), helper applications, plug-ins, and the like. A server may include a web service that receives a request from a web server, the request including a URL and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. For example, representational state transfer (REST), or RESTful, web services may provide one way of enabling interoperability between applications.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WEBSPHERE MQ™ (formerly MQSeries) by IBM®, Inc. (Armonk, N.Y.) is an example of a commercially available middleware product. An Enterprise Service Bus ("ESB") application is another example of middleware.

Those skilled in the art will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT, JAVASCRIPT Object Notation ("JSON"), VBScript, Macromedia Cold Fusion, COBOL, MICROSOFT® Active Server Pages, assembly, PERL, PHP, awk, Python, Ruby, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT, VBScript or the like. Cryptography and network security methods are well known in the art, and are covered in many standard texts.

In various embodiments, the software elements of the system may also be implemented using Node.js®. Node.js® may implement several modules to handle various core functionalities. For example, a package management module, such as Npm®, may be implemented as an open source library to aid in organizing the installation and management of third-party Node.js® programs. Node.js® may also implement a process manager, such as, for example, Parallel Multithreaded Machine ("PM2"); a resource and performance monitoring tool, such as, for example, Node Application Metrics ("appmetrics"); a library module for building user interfaces, such as for example ReachJS®; and/or any other suitable and/or desired module.

A bank may be part of the system, but the bank may represent other types of card issuing institutions, such as credit card companies, card sponsoring companies, or third party issuers under contract with financial institutions. It is further noted that other participants may be involved in some phases of the transaction, such as an intermediary settlement institution, but these participants are not shown.

Each participant is equipped with a computing device in order to interact with the system and facilitate online commerce transactions. The customer has a computing unit in the form of a personal computer, although other types of computing units may be used including laptops, notebooks, hand held computers, set-top boxes, cellular telephones, touch-tone telephones and the like. The merchant has a computing unit implemented in the form of a computer-server, although other implementations are contemplated by the system. The bank has a computing center shown as a main frame computer. However, the bank computing center may be implemented in other forms, such as a mini-computer, a PC server, a network of computers located in the same of different geographic locations, or the like. Moreover, the system contemplates the use, sale or distribution of any goods, services or information over any network having similar functionality described herein The merchant computer and the bank computer may be interconnected via a second network, referred to as a payment network. The payment network which may be part of certain transactions represents existing proprietary networks that presently accommodate transactions for credit cards, debit cards, and other types of financial/banking cards. The payment network is a closed network that is assumed to be secure from eavesdroppers. Exemplary transaction networks may include the American Express®, VisaNet®, Veriphone®, Discover Card®, PayPal®, ApplePay®, GooglePay®, private networks (e.g., department store networks), and/or any other payment networks.

The electronic commerce system may be implemented at the customer and issuing bank. In an exemplary implementation, the electronic commerce system is implemented as computer software modules loaded onto the customer computer and the banking computing center. The merchant computer does not require any additional software to participate in the online commerce transactions supported by the online commerce system.

As will be appreciated by one of ordinary skill in the art, the system may be embodied as a customization of an existing system, an add-on product, a processing apparatus executing upgraded software, a stand-alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS®, webpages, websites, web forms, prompts, etc. Practitioners will appreciate that the illustrated steps described herein may comprise in any number of configurations including the use of WINDOWS®, webpages, web forms, popup WINDOWS®, prompts and the like. It should be further appreciated that the multiple steps as illustrated and described may be combined into single webpages and/or WINDOWS® but have been expanded for the sake of simplicity. In other cases, steps illustrated and described as single process steps may be separated into multiple webpages and/or WINDOWS® but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is intended to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method, comprising:
   receiving, by a processor, a connection request from a mobile application installed on a user device, wherein the user device comprises a pinned certificate that is decoupled from the mobile application, wherein the pinned certificate comprises a leaf certificate digitally signed by an intermediate certificate and wherein the intermediate certificate is digitally sinned by a root certificate;

determining, by the processor, a certificate version of the pinned certificate;

querying, by the processor, a certificate repository based on the pinned certificate to locate a stored certificate;

determining, by the processor, whether the certificate version of the pinned certificate matches a second certificate version of the stored certificate in the certificate repository;

transmitting, by the processor, the stored certificate to the user device, in response to the certificate version of the pinned certificate not matching the second certificate version of the stored certificate, wherein the leaf certificate in the pinned certificate is different than a second leaf certificate in the stored certificate; and automatically updating, by the processor, the pinned certificate on the user device to comprise data from the stored certificate.

2. The method of claim 1, further comprising validating, by the processor, the pinned certificate by decrypting the root certificate and the intermediate certificate.

3. The method of claim 1, further comprising granting, by the processor, the connection request from the mobile application in response to updating the pinned certificate on the user device.

4. The method of claim 1, further comprising installing, by the processor, the mobile application on the user device, wherein the mobile application comprises the pinned certificate.

5. The method of claim 4, further comprising:
decoupling, by the processor, the pinned certificate from the mobile application; and storing, by the processor, the decoupled pinned certificate on the user device.

6. A system comprising:
a processor,
a tangible, non-transitory memory configured to communicate with the processor,
the tangible, non-transitory memory having instructions stored thereon that, in response to execution by the processor, cause the processor to perform operations comprising:
receiving, by the processor, a connection request from a mobile application installed on a user device, wherein the user device comprises a pinned certificate that is decoupled from the mobile application, wherein the pinned certificate comprises a leaf certificate digitally signed by an intermediate certificate, and wherein the intermediate certificate is digitally sinned by a root certificate:
determining, by the processor, a certificate version of the pinned certificate;
querying, by the processor, a certificate repository based on the pinned certificate to locate a stored certificate;
determining, by the processor, whether the certificate version of the pinned certificate matches a second certificate version of the stored certificate in the certificate repository;
transmitting, by the processor, the stored certificate to the user device, in response to the certificate version of the pinned certificate not matching the second certificate version of the stored certificate, wherein the leaf certificate in the pinned certificate is different than a second leaf certificate in the stored certificate; and
automatically updating, by the processor, the pinned certificate on the user device to comprise data from the stored certificate.

7. The system of claim 6, further comprising validating, by the processor, the pinned certificate by decrypting the root certificate and the intermediate certificate.

8. The system of claim 6, further comprising granting, by the processor, the connection request from the mobile application in response to updating the pinned certificate on the user device.

9. The system of claim 6, further comprising installing, by the processor, the mobile application on the user device, wherein the mobile application comprises the pinned certificate.

10. The system of claim 9, further comprising:
decoupling, by the processor, the pinned certificate from the mobile application; and
storing, by the processor, the decoupled pinned certificate on the user device.

11. An article of manufacture including a non-transitory, tangible computer readable storage medium having instructions stored thereon that, in response to execution by a computer based system, cause the computer based system to perform operations comprising:
receiving, by the computer based system, a connection request from a mobile application installed on a user device, wherein the user device comprises a pinned certificate that is decoupled from the mobile application wherein the pinned certificate comprises a leaf certificate digitally signed by an intermediate certificate, and wherein the intermediate certificate is digitally signed by a root certificate;
determining, by the computer based system, a certificate version of the pinned certificate;
querying, by the computer based system, a certificate repository based on the pinned certificate to locate a stored certificate;
determining, by the computer based system, whether the certificate version of the pinned certificate matches a second certificate version of the stored certificate in the certificate repository;
transmitting, by the computer based system, the stored certificate to the user device, in response to the certificate version of the pinned certificate not matching the second certificate version of the stored certificate, wherein the leaf certificate in the pinned certificate is different than a second leaf certificate in the stored certificate; and
automatically updating, by the computer based system, the pinned certificate on the user device to comprise data from the stored certificate.

12. The article of manufacture of claim 11, further comprising validating, by the computer based system, the pinned certificate by decrypting the root certificate and the intermediate certificate.

13. The article of manufacture of claim 11, further comprising granting, by the computer based system, the connection request from the mobile application in response to updating the pinned certificate on the user device.

14. The article of manufacture of claim 11, further comprising:
installing, by the computer based system, the mobile application on the user device, wherein the mobile application comprises the pinned certificate;

decoupling, by the computer based system, the pinned certificate from the mobile application; and storing, by the computer based system, the decoupled pinned certificate on the user device.

\* \* \* \* \*